(12) United States Patent
Hirayama et al.

(10) Patent No.: US 10,661,247 B2
(45) Date of Patent: May 26, 2020

(54) FERROMAGNETIC-PARTICLE MANUFACTURING APPARATUS

(71) Applicant: DAI-ICHI HIGH FREQUENCY CO., LTD., Tokyo (JP)

(72) Inventors: Kotaro Hirayama, Tokyo (JP); Shota Tanoue, Tokyo (JP)

(73) Assignee: DAI-ICHI HIGH FREQUENY CO., LTD., Tokyo (JP)

( * ) Notice: Subject to any disclaimer, the term of this patent is extended or adjusted under 35 U.S.C. 154(b) by 0 days.

(21) Appl. No.: 16/272,877

(22) Filed: Feb. 11, 2019

(65) Prior Publication Data

US 2019/0168183 A1 Jun. 6, 2019

Related U.S. Application Data

(63) Continuation of application No. 14/915,941, filed as application No. PCT/JP2014/076727 on Oct. 6, 2014, now abandoned.

(30) Foreign Application Priority Data

Oct. 7, 2013 (JP) .................................. 2013-210407

(51) Int. Cl.
*B01J 19/12* (2006.01)
*C01G 49/00* (2006.01)
(Continued)

(52) U.S. Cl.
CPC ............. *B01J 19/126* (2013.01); *B01J 19/02* (2013.01); *B01J 19/06* (2013.01); *B22F 1/0011* (2013.01);
(Continued)

(58) Field of Classification Search
None
See application file for complete search history.

(56) References Cited

U.S. PATENT DOCUMENTS

| 5,471,037 A | 11/1995 | Goethel et al. |
| 6,268,596 B1 | 7/2001 | Lauf et al. |

(Continued)

FOREIGN PATENT DOCUMENTS

| JP | 2002-173327 | * | 6/2002 |
| JP | 2002-173327 A | | 6/2002 |

(Continued)

OTHER PUBLICATIONS

International Search Report, issued in PCT/JP2014/076727, dated Nov. 25, 2014.

*Primary Examiner* — Kishor Mayekar
(74) *Attorney, Agent, or Firm* — Birch, Stewart, Kolasch & Birch, LLP (57) ABSTRACT

A method for manufacturing a ferromagnetic-particle includes preparing a manufacturing apparatus including a single mode cavity that resonates with a microwave of a predetermined wavelength; a microwave oscillator electrically connected to the single mode cavity and configured to introduce the microwave of a predetermined wavelength into the single mode cavity; a pipe disposed to pass linearly through an inside of the single mode cavity, the pipe being formed of a dielectric material; and a pump configured to introduce, from one end of the pipe, an alkaline reaction liquid in which metal ions of a ferromagnetic metal and hydroxide ions are dissolved; and reacting the reaction liquid in the pipe, introduced by the pump, by introducing the microwave into the single mode cavity so as to generate the ferromagnetic-particle in the pipe.

8 Claims, 2 Drawing Sheets

(51) Int. Cl.
*C01G 53/00* (2006.01)
*H05B 6/80* (2006.01)
*H01F 1/20* (2006.01)
*B22F 1/00* (2006.01)
*B01J 19/02* (2006.01)
*C01G 49/08* (2006.01)
*C01G 53/04* (2006.01)
*H05B 6/10* (2006.01)
*B01J 19/06* (2006.01)
*B22F 9/24* (2006.01)

(52) U.S. Cl.
CPC ............ *B22F 9/24* (2013.01); *C01G 49/0018* (2013.01); *C01G 49/08* (2013.01); *C01G 53/04* (2013.01); *C01G 53/40* (2013.01); *H01F 1/20* (2013.01); *H05B 6/108* (2013.01); *H05B 6/806* (2013.01); *B01J 2219/0204* (2013.01); *B01J 2219/0871* (2013.01); *B01J 2219/0877* (2013.01); *B01J 2219/1215* (2013.01); *B01J 2219/1245* (2013.01); *B22F 2009/245* (2013.01); *B22F 2301/15* (2013.01); *B22F 2301/35* (2013.01); *B22F 2999/00* (2013.01); *C01P 2006/42* (2013.01); *C22C 2202/02* (2013.01); *H05B 2214/04* (2013.01)

(56) References Cited

U.S. PATENT DOCUMENTS

| | | |
|---|---|---|
| 2001/0054549 A1 | 12/2001 | Park et al. |
| 2007/0108195 A1* | 5/2007 | Tian ................... B23K 13/01 |
| | | 219/702 |
| 2010/0119429 A1 | 5/2010 | Mullins et al. |
| 2011/0263843 A1 | 10/2011 | Watanabe et al. |
| 2012/0145945 A1* | 6/2012 | Strom ................... B22F 1/0018 |
| | | 252/62.53 |
| 2014/0121395 A1* | 5/2014 | Ishizuka .............. B01J 19/0013 |
| | | 554/170 |

FOREIGN PATENT DOCUMENTS

| | | | |
|---|---|---|---|
| JP | 2002-186849 | A | 7/2002 |
| JP | 2005-159065 | A | 6/2005 |
| JP | 2006-27994 | A | 2/2006 |
| JP | 2006-28032 | A | 2/2006 |
| JP | 2008-110889 | A | 5/2008 |
| JP | 2010-207735 | * | 9/2010 |
| JP | 2010-207735 | A | 9/2010 |
| JP | 2011-502088 | A | 1/2011 |
| WO | WO 2013/001629 | * | 1/2013 |
| WO | WO 2013/001629 A1 | | 1/2013 |

\* cited by examiner

FERROMAGNETIC-PARTICLE MANUFACTURING APPARATUS

CROSS REFERENCE TO RELATED APPLICATIONS

This application is a Continuation of application Ser. No. 14/915,941 filed on Mar. 2, 2016, which is the National Phase under 35 U.S.C. § 371 of International Application No. PCT/JP2014/076727, filed on Oct. 6, 2014, which claims the benefit under 35 U.S.C. § 119(a) to Patent Application No. 2013-210407, filed in Japan on Oct. 7, 2013, all of which are hereby expressly incorporated by reference into the present application.

TECHNICAL FIELD

The present invention relates to a ferromagnetic-particle manufacturing apparatus.

BACKGROUND ART

Due to magnetic properties, ferromagnetic particles (nanoparticles) are recently used as active pharmaceutical ingredients for a magnetic resonance imaging method (MRI), a drug delivery system (DDS), a local hyperthermia treatment and so on.

JP2006-28032A discloses a method of generating magnetite particles, which are one type of such ferromagnetic particles, by using a coprecipitation reaction. Specifically in this method, a predetermined amount of ferrous chloride ($FeCl_2$) solution and a predetermined amount of ferric chloride ($FeCl_3$) solution are put into a reaction container. While the solutions are heated and stirred in the reaction container, sodium hydroxide (NaOH) solution is added thereto. Thus, a coprecipitation reaction between ferrous ions ($Fe^{2+}$) and ferric ions ($Fe^{3+}$) occurs so that magnetite ($Fe_3O_4$) particles are generated.

In such a conventional method, when magnetite particles are industrially produced in large volume, a great amount of reaction liquid is stirred in a reaction container. In this case, the reaction liquid is likely to vary in temperature and a mixed condition of the reaction liquid is likely to be non-uniform, which makes it difficult to improve generation efficiency of magnetite particles. There is another problem in that the thus generated magnetite particles tend to vary widely in composition and dimension.

In addition, in the manufacture of active pharmaceutical ingredients, regulations related to production control and quality control on medical drugs and medical devices, i.e., the GMP (Good Manufacturing Practice) must be observed in general. To be specific, for example, a reaction liquid is required to be maintained in an aseptic condition without being reacted with an outside air. However, in the conventional method in which a reaction liquid is stirred in a reaction container, it is difficult to comply with the GMP.

SUMMARY OF THE INVENTION

In view of the above disadvantages, the present invention has been made for efficiently solve the same. The object of the present invention is to provide a ferromagnetic-particle manufacturing apparatus capable of efficiently manufacturing ferromagnetic particles.

The present invention is a ferromagnetic-particle manufacturing apparatus including: a single mode cavity that resonates with a microwave of a predetermined wavelength; a microwave oscillator electrically connected to the single mode cavity and configured to introduce the microwave of a predetermined wavelength into the single mode cavity; a pipe disposed to pass through an inside of the single mode cavity, the pipe being formed of a dielectric material; and a pump configured to introduce, from one end of the pipe, an alkaline reaction liquid in which metal ions of a ferromagnetic metal and hydroxide ions are dissolved; wherein ferromagnetic particles are generated by reacting the reaction liquid.

According to the present invention, the reaction liquid introduced from the one end of the pipe is heated by the microwave in the single mode cavity, so that the reaction of the reaction liquid is promoted and thus ferromagnetic particles are generated. When ferromagnetic particles are generated in the pipe, the thus generated ferromagnetic particles and the microwave are magnetically coupled. Thus, a rate of a reflected wave relative to an incident wave of the microwave decreases, so that an impedance of the single mode cavity increases. In this case, by measuring the impedance in the single mode cavity, a production efficiency of ferromagnetic particles in the pipe can be easily estimated from outside. In addition, according to the present invention, ferromagnetic particles are continuously generated in the pipe, without need for stirring the reaction liquid in a reaction container. Thus, the reaction liquid is unlikely to vary in temperature and a mixed condition of the reaction liquid is unlikely to be non-uniform, so that variation of the generated ferromagnetic particles in composition and dimension is small. In addition, it is easy to observe the GMP.

Preferably, the ferromagnetic-particle manufacturing apparatus further includes: an impedance measuring device configured to measure an impedance of the single mode cavity; and a pump-flowrate deciding unit configured to decide, based on a measurement result of the impedance measuring device, a pump flowrate by which the impedance of the single mode cavity becomes a predetermined value or more; wherein the pump is configured to introduce the reaction liquid at the pump flowrate decided by the pump-flowrate deciding unit. In this embodiment, due to the application of the aforementioned principle of impedance elevation, a production efficiency of ferromagnetic particles is improved. That is to say, as the pump flowrate increases, a generation efficiency of ferromagnetic particles also increases until the pump flowrate reaches a certain threshold value. In accordance therewith, the impedance increases. However, at a pump flowrate beyond the threshold value, an unreacted reaction liquid outflows from the other end of the pipe, which in turn decreases the generation efficiency of ferromagnetic particles. In accordance therewith, the impedance decreases. Thus, in this embodiment, since the pump-flowrate deciding unit decides a pump flowrate by which the impedance becomes a predetermined value or more, and the reaction liquid is introduced from the one end of the pipe at the flowrate decided by the pump-flowrate deciding unit, a production efficiency of ferromagnetic particles can be maintained at a desired level or more.

Specifically, for example, an axial length of the pipe is 20 mm to 200 mm.

In addition, the present invention is a ferromagnetic-particle manufacturing apparatus includes: an induction heating coil; a radiofrequency power source electrically connected to the induction heating coil and configured to form an alternating field inside the induction heating coil; a pipe being disposed to pass through the inside of the induction heating coil, in which at least a partial area of the pipe in an axial direction thereof is formed of a dielectric material and an area, which is nearer to one end of the pipe than the area formed of a dielectric material, is formed of a conductive material; and a pump configured to introduce, from the one end of the pipe, an alkaline reaction liquid in which metal ions of a ferromagnetic metal and hydroxide ions are dissolved; wherein ferromagnetic particles are generated by reacting the reaction liquid.

According to the present invention, the area of the pipe, which is formed of a conductive material, is induction-heated by the alternating field inside the induction heating coil, and the reaction liquid introduced from the one end of the pipe is heated by the heat generated by the area formed of a conductive material, so that the reaction of the reaction liquid is promoted and thus ferromagnetic particles are generated. When ferromagnetic particles are generated in the pipe, the thus generated ferromagnetic particles function as a core (magnetic core) in the area of the pipe, which is formed of a dielectric material. Thus, the inductance of the induction heating coil increases, so that the impedance of the induction heating coil increases. In this case, by measuring the impedance of the induction heating coil, a production efficiency of ferromagnetic particles in the pipe can be easily estimated from outside. In addition, according to the present invention, ferromagnetic particles are continuously generated in the pipe, without need for stirring the reaction liquid in a reaction container. Thus, the reaction liquid is unlikely to vary in temperature and/or a mixed condition of the reaction liquid is unlikely to be non-uniform, so that variation of the generated ferromagnetic particles in composition and dimension is small. In addition, it is easy to observe the GMP.

Preferably, the ferromagnetic-particle manufacturing apparatus further includes: an impedance measuring device configured to measure an impedance of the induction heating coil; and a pump-flowrate deciding unit configured to decide, based on a measurement result of the impedance measuring device, a pump flowrate by which the impedance of the induction heating coil becomes a predetermined value or more; wherein the pump is configured to introduce the reaction liquid at the pump flowrate decided by the pump-flowrate deciding unit. In this embodiment, due to the application of the aforementioned principle of impedance elevation, a production efficiency of ferromagnetic particles is improved. That is to say, as the pump flowrate increases, a generation efficiency of ferromagnetic particles also increases until the pump flowrate reaches a certain threshold value. In accordance therewith, the impedance increases. However, at a pump flowrate beyond the threshold value, an unreacted reaction liquid outflows from the other end of the pipe, which in turn decreases the generation efficiency of ferromagnetic particles. In accordance therewith, the impedance decreases. Thus, in this embodiment, since the pump-flowrate deciding unit decides a pump flowrate by which the impedance becomes a predetermined value or more, and the reaction liquid is introduced from the one end of the pipe at the flowrate decided by the pump-flowrate deciding unit, a production efficiency of ferromagnetic particles can be maintained at a desired level or more.

Specifically, for example, an axial length of the area of the pipe, which is formed of a conductive material, is 20 mm to 200 mm.

In addition, specifically, for example, the metal ions of the ferromagnetic metal are either or both of iron ions and nickel ions. For example, magnetite particles as ferromagnetic particles are generated from an alkaline reaction liquid, in which ferrous ions and ferric ions are dissolved, by means of the coprecipitation reaction between the ferrous ions and the ferric ions. In addition, nickel ferrite particles as ferromagnetic particles are generated from an alkaline reaction liquid, in which ferric ions and nickel ions are dissolved, by means of the coprecipitation reaction between the ferric ions and the nickel ions.

In addition, specifically, for example, sodium hydroxide is dissolved in the reaction liquid.

In addition, specifically, for example, an internal diameter of the pipe is 0.3 mm to 5.0 mm.

Preferably, an inner surface of the pipe is treated with a corrosion protective covering. Glass and various synthetic resins, such as polyethylene, polypropylene and fluorine resin, may be used as a covering material. Polyolefin such as polyethylene and polypropylene is preferred, and polypropylene is particularly preferred. According to this embodiment, smoothness to a reaction liquid flowing through the pipe can be maintained all the time.

The pump-flowrate deciding unit or respective elements of the pump-flowrate deciding unit can be realized by a computer system.

In addition, a program for executing them in the computer system and a computer-readable storage medium storing the program are also the subject matters of the present invention.

Herein, the storage medium includes one that can be recognized by itself, such as a flexible disc, and a network in which various signals are transmitted.

MODES FOR CARRYING OUT THE INVENTION

Embodiments of the present invention will be described in detail herebelow with reference to the attached drawings.

Figure 1:
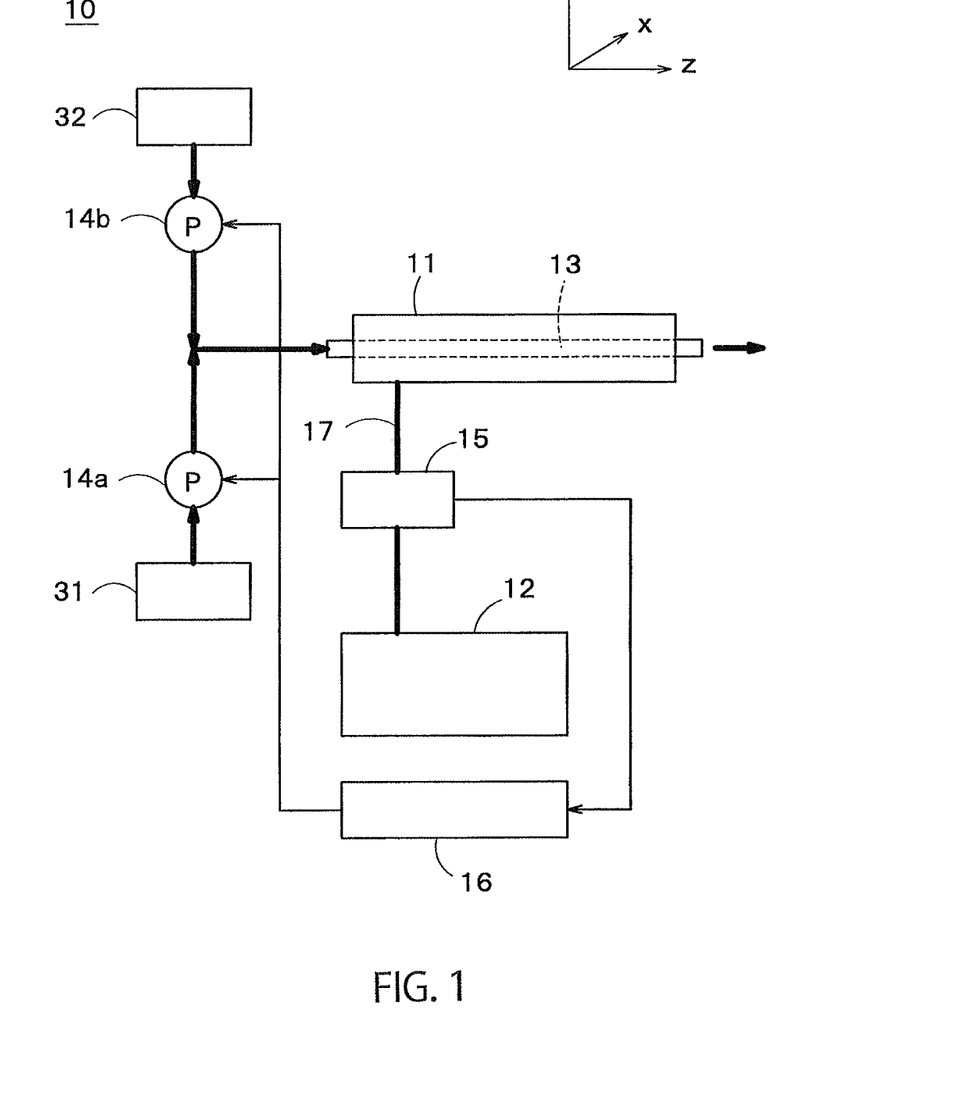
FIG. 1 is a schematic structural view showing a ferromagnetic-particle manufacturing apparatus in a first embodiment of the present invention.

FIG. 1 is a schematic structural view showing a ferromagnetic-particle manufacturing apparatus in a first embodiment of the present invention.

As shown in FIG. 1, a ferromagnetic-particle manufacturing apparatus 10 in this embodiment includes: a single mode cavity 11 that resonates with a microwave of a predetermined wavelength; a microwave oscillator 12 electrically connected to the single mode cavity 11 and configured to introduce the microwave of a predetermined wavelength into the single mode cavity 11; a pipe 13 disposed to pass through the inside of the single mode cavity 11, the pipe 13 being formed of a dielectric material; and pumps 14a and 14b configured to introduce, from one end of the pipe 13, an alkaline reaction liquid in which metal ions of a ferromagnetic metal and hydroxide ions are dissolved.

The single mode cavity 11 is a hollow container made of a conductive wall such as a metal, and is also referred to as cavity resonator. The single mode cavity 11 is configured to resonate with a microwave of a predetermined wavelength which is specified depending on a size, a shape and a mode of the single mode cavity 11. Namely, inside the single mode cavity 11, only the microwave of a predetermined wavelength can exist as a standing wave. To be specific, for example, the single mode cavity 11 has a parallelepiped shape having a length of 150 mm in a right and left direction (z direction), a length of 109.2 mm in an up and down direction (y direction), and a length of 54.5 mm in a direction perpendicular to a sheet plane (x direction) in FIG. 1. In a TE10 mode in which a microwave is transmitted in the z direction, the single mode cavity 11 is configured to resonate with a microwave having a wavelength of 120 mm.

The microwave oscillator 12 is electrically connected to the single mode cavity 11 through a coaxial cable 17, and is capable of introducing the microwave of a predetermined wavelength into the single mode cavity 11.

The pipe 13 in this embodiment is a resin pipe of a cylindrical shape. To be specific, for example, an internal diameter of the pipe 13 is 0.3 mm to 5.0 mm, and an axial length thereof is 20 mm to 200 mm. A material of the pipe 13 is, e.g., polyvinyl chloride.

As shown in FIG. 1, the pipe 13 coaxially passes through the inside of the single mode cavity 11, with an axis of the pipe 13 being oriented in parallel to the z direction of the single mode cavity 11. An inner surface of the pipe 13 is treated with a corrosion protective covering, so that smoothness to a liquid flowing through the pipe 13 is maintained all the time. Glass and various synthetic resins, such as polyethylene, polypropylene and fluorine resin, may be used as a covering material. Polyolefin such as polyethylene and polypropylene is preferred, and polypropylene is particularly preferred.

In this embodiment, as shown in FIG. 1, a first liquid tank 31 is liquid-tightly connected to the one end of the pipe 13 via the pump 14a associated with the first liquid tank 31, and a second liquid tank 32 is liquid-tightly connected to the one end of the pipe 13 via the pump 14b associated with the second liquid tank 32.

The first liquid tank 31 accommodates a metal salt solution containing metal ions of a ferromagnetic metal. To be specific, for example, metal ions of the ferromagnetic metal are either or both of iron ions and nickel ions. In this embodiment, an iron salt solution, in which ferrous chloride ($FeCl_2$) and ferric chloride ($FeCl_3$) are dissolved in a molar ratio of 1:2, is accommodated in the first liquid tank 31. Alternatively, an iron salt solution, in which ferrous sulfate ($FeSO_4$) and ferric sulfate ($Fe_2(SO_4)_3$) are dissolved in a molar ratio of 1:1, may be accommodated in the first liquid tank 31.

On the other hand, the second liquid tank 32 accommodates an alkaline solution containing hydroxide ions. To be specific, for example, an alkaline solution in which sodium hydroxide (NaOH) is dissolved is accommodated in the second liquid tank 32.

The pumps 14a and 14b in this embodiment are configured to introduce a mixed liquid (hereinafter referred to as reaction liquid), in which the iron salt solution accommodated in the first liquid tank 31 and the alkaline solution accommodated in the second liquid tank 32 are mixed, is introduced from the one end of the pipe 13 such that a molar flowrate of ferrous ions ($Fe^{2+}$), ferric ions ($Fe^{3+}$) and hydroxide ions ($OH^-$) is 1:2:8.

The ferromagnetic-particle manufacturing apparatus 10 in this embodiment further includes an impedance measuring device 15 that measures an impedance of the single mode cavity 11, and a pump-flowrate deciding unit 16 that decides, based on a measurement result of the impedance measuring device 15, a pump flowrate by which the impedance of the single mold cavity 11 becomes a predetermined value or more.

In this embodiment, as shown in FIG. 1, the impedance measuring device 15 is electrically connected to the coaxial cable 17, and is configured to measure the impedance of the single mode cavity 11 through the coaxial cable 17.

The pump-flowrate deciding unit 16 is specifically formed of, e.g., a computer system including a storage unit storing a control program or the like. The storage unit of the pump-flowrate deciding unit 16 is configured to previously store a target value of the impedance of the single mode cavity 11. As described below, the target value may be decided based on, e.g., a measurement result change of the impedance measuring device 15 with respect to a pump flowrate change.

In addition, the pump-flowrate deciding unit 16 is configured to decide, based on a measurement result of the impedance measuring device 15, a pump flowrate (pump flowrate set value) by which the impedance of the single mode cavity 11 becomes the previously stored target value or more. Each of the pumps 14a and 14b is configured to introduce the reaction liquid from the one end of the pipe 13 at the pump flow rate (pump flowrate set value) decided by the pump-flowrate deciding unit 16.

Next, an operation of the embodiment as described above is described.

Firstly, an alkaline reaction liquid, in which ferrous ions ($Fe^{2+}$), ferric ions ($Fe^{3+}$) and hydroxide ions (OFF) are dissolved in a molar ratio of 1:2:8, is introduced from the one end of the pipe 13 by the pumps 14a and 14b. In addition, a microwave of a predetermined wavelength (e.g., 120 mm) is introduced from the microwave oscillator 12 into the single mode cavity 11.

The reaction liquid flowing through the pipe 13 is heated by the microwave introduced into the single mode cavity 11 up to a reaction temperature (e.g., 40° C. to 80° C.). Thus, reaction of the reaction liquid is promoted and a coprecipitation reaction between the ferrous ions ($Fe^{2+}$) and the ferric ions ($Fe^{3+}$) occurs, whereby magnetite ($Fe_3O_4$) particles are generated. The thus generated magnetite particles are moved by a pressure of the reaction liquid flowing through the pipe 13 so as to be taken out from the other end of the pipe 13.

When the magnetite particles are generated in the pipe 13, the magnetite particles and the microwave are magnetically coupled. Thus, a rate of a reflected wave relative to an incident wave of the microwave decreases, so that an impedance of the single mode cavity 11 increases. The impedance of the single mode cavity 11 is measured by the impedance measuring device 15.

The pump-flowrate deciding unit 16 reads out a measurement result from the impedance measuring device 15, and compares the measurement result with the previously stored target value.

When the measurement result is equal to or larger than the target value, the flowrate of each of the pumps 14a and 14b at this time is decided as the aforementioned pump flowrate set value.

On the other hand, when the measurement result is smaller than the target value, the measurement result is stored in the pump-flowrate deciding unit 16, and the pumps 14a and 14b are controlled such that the flowrate of the reaction liquid introduced into the one end of the pipe 13 increases.

In principle, as the pump flowrate increases, a generation efficiency of magnetite particles also increases until the pump flowrate reaches a certain threshold value. In accordance therewith, the impedance of the single mode cavity 11 increases (case 1). However, as the pump flowrate increases after exceeding the threshold value, an unreacted reaction liquid outflows from the other end of the pipe 13, which in turn decreases the generation efficiency of magnetite particles. In accordance therewith, the impedance of the single mode cavity 11 decreases (case 2).

The pump-flowrate deciding unit 16 reads out a measurement result from the impedance measuring device 15, and compares the measurement result with the stored previous measurement result.

When the current measurement result is larger than the stored previous measurement result, the situation is judged as the case 1, and the pumps 14a and 14b are controlled such that the flowrate of the reaction liquid introduced to the one end of the pipe 13 gradually increases. During this operation, the pump-flowrate deciding unit 16 successively reads out measurement results from the impedance measuring device 15, and compares the measurement results with the previously stored target value. At a time when one of the measurement results becomes the target value or more, the pump-flowrate deciding unit 16 decides each of the flowrates of the pumps 14a and 14b as the aforementioned pump flowrate set value.

On the other hand, when the current measurement result is smaller than the stored previous measurement result, the situation is judged as the case 2, and the pumps 14a and 14b are controlled such that the flowrate of the reaction liquid introduced to the one end of the pipe 13 gradually decreases. During this operation, the pump flow rate deciding unit 16 successively reads out measurement results from the impedance measuring device 15, and compares the measurement results with the previously stored target value. At a time when one of the measurement results becomes the target value or more, the pump-flowrate deciding unit 16 decides each of the flowrates of the pumps 14a and 14b as the aforementioned pump flowrate set value.

Then, each of the pumps 14a and 14b is set such that the reaction liquid is introduced from the one end of the pipe 13 at the pump flowrate (pump flowrate set value) decided by the pump-flowrate deciding unit 16. Thus, magnetite particles are hereafter generated in the pipe 13 at a desired generation efficiency or more corresponding to the impedance target value previously stored in the pump-flowrate deciding unit 16.

According to the above embodiment, the reaction liquid introduced from the one end of the pipe 13 is heated by the microwave in the single mode cavity 11, so that the reaction of the reaction liquid is promoted and thus ferromagnetic particles are generated. When ferromagnetic particles are generated in the pipe 13, the thus generated ferromagnetic particles and the microwave are magnetically coupled. Thus, a rate of a reflected wave relative to an incident wave of the microwave decreases, so that an impedance of the single mode cavity 11 increases. In this case, by measuring the impedance in the single mode cavity 11, a production efficiency of ferromagnetic particles in the pipe 13 can be easily estimated from outside.

In addition, according to this embodiment, ferromagnetic particles are continuously generated in the pipe 13, without need for stirring the reaction liquid in the reaction container. Thus, the reaction liquid is unlikely to vary in temperature and the mixed condition of the reaction liquid is unlikely to be non-uniform, so that variation of the generated ferromagnetic particles in composition and dimension is small. In addition, it is easy to observe the GMP.

In addition, in this embodiment, due to the application of the aforementioned principle of impedance elevation, a production efficiency of ferromagnetic particles is improved. That is to say, as the pump flowrate increases, a generation efficiency of ferromagnetic particles also increases until the pump flowrate reaches a certain threshold value. In accordance therewith, the impedance increases. However, at a pump flowrate beyond the threshold value, an unreacted reaction liquid outflows from the other end of the pipe, which in turn decreases the generation efficiency of ferromagnetic particles. In accordance therewith, the impedance decreases. Thus, in this embodiment, the pump-flowrate deciding unit 16 decides a pump flowrate by which the impedance becomes a predetermined value or more. Since the reaction liquid is introduced from the one end of the pipe 13 at the flowrate decided by the pump-flowrate deciding unit 16, a production efficiency of ferromagnetic particles can be maintained at a desired level or more.

Next, a second embodiment of the present invention is described with reference to FIG. 2.

Figure 2:
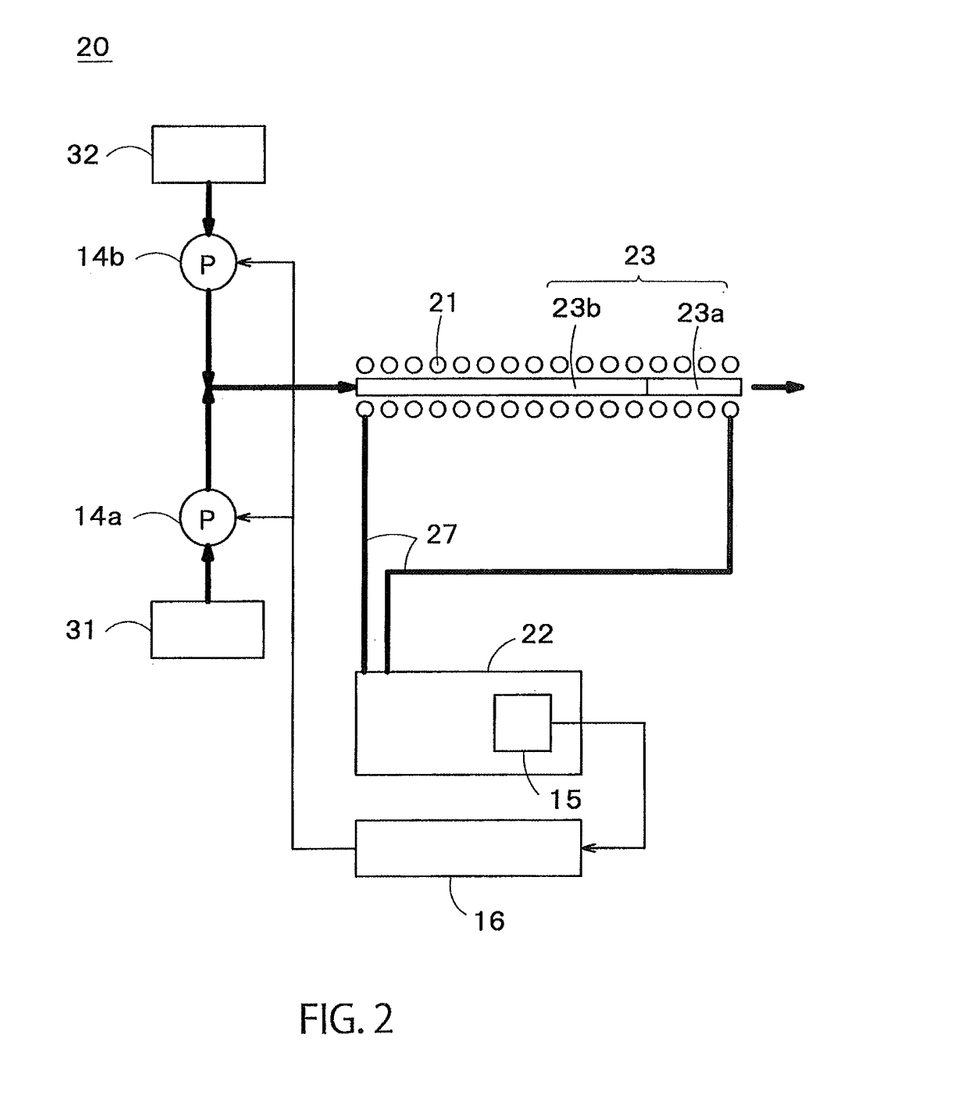
FIG. 2 is a schematic structural view showing a ferromagnetic-particle manufacturing apparatus in a second embodiment of the present invention.

FIG. 2 is a schematic structural view showing a ferromagnetic-particle manufacturing apparatus in a second embodiment of the present invention.

As shown in FIG. 2, in place of the single mode cavity 11, the microwave oscillator 12 and the pipe 13 formed of a dielectric material of the ferromagnetic-particle manufacturing apparatus 10 in the first embodiment, a ferromagnetic-particle manufacturing apparatus 20 in the second embodiment includes: an induction heating coil 21; a radiofrequency power source 22 electrically connected to the induction heating coil 21 and configured to form an alternating field inside the induction heating coil 21; and a pipe 23 disposed to pass through the inside of the induction heating coil 21. At least a partial area 23a of the pipe 23 in an axial direction thereof is formed of a dielectric material. An area 23b, which is nearer to one end of the pipe 2 than the area 23a formed of a dielectric material, is formed of a conductive material.

The induction heating coil 21 is a solenoid coil having a cylindrical shape. For example, a diameter of the induction heating coil 21 is 20 mm, and an axial length thereof is 150 mm.

The radiofrequency power source 22 is electrically connected to the induction heating coil 21 through a radiofrequency cable 27, and is capable of supplying an alternating current of a predetermined frequency (e.g., 20 kHz) to the induction heating coil 21 so as to form an alternating field inside the induction heating coil 21.

The pipe 23 in this embodiment is formed by coaxially connecting a resin pipe 23a having a cylindrical shape, and a metal pipe 23b having a cylindrical shape that has the same internal diameter as that of the resin pipe 23a. To be specific, for example, an axial length of the resin pipe 23a is 20 mm to 200 mm, and an axial length of the metal pipe 23b is 20 mm to 200 mm. The internal diameters of the resin pipe 23a and the metal pipe 23b are both 0.3 mm to 5.0 mm. A material of the resin pipe 23a is, e.g., polyvinyl chloride, while a material of the metal pipe 23b is e.g., stainless.

As shown in FIG. 2, the pipe 23 is coaxially passes through the inside of the induction heating coil 21, with an axis of the pipe 23 being oriented in parallel to an axis of the induction heating coil 21. A first liquid tank 31 is liquid-tightly connected to the one end of the pipe 23 on the side of the metal pipe 23b via the pump 14a associated with the first liquid tank 31, and a second liquid tank 32 is liquid-tightly connected to the one end of the pipe 23 on the side of the metal pipe 23b via the pump 14b associated with the second liquid tank 32. An inner surface of the pipe 23 is treated with a corrosion protective covering, so that smoothness to a liquid flowing through the pipe 23 is maintained all the time.

In this embodiment, as shown in FIG. 2, an impedance measuring device 15 is incorporated in the radiofrequency power source 22, and is configured to measure an impedance of the induction heating coil 21. In general, the commercially available radiofrequency power source 22 incorporates the impedance measuring device 15. However, when the radiofrequency power source 22 that does not incorporate the impedance measuring device 15 is used, the impedance measuring device 15 may be located outside the radiofrequency power source 22.

A pump-flowrate deciding unit 16 in this embodiment is configured to previously store a target value (predetermined value) of the impedance of the induction heating coil 21.

The other structure is substantially the same as that of the first embodiment shown in FIG. 1. In FIG. 2, the same part as that of the first embodiment is shown by the same reference number, and detailed description thereof is omitted.

Next, an operation of the embodiment as described above is described.

Firstly, an alkaline reaction liquid, in which ferrous ions ($Fe^{2+}$), ferric ions ($Fe^{3+}$) and hydroxide ions (OH) are dissolved in a molar ratio of 1:2:8, is introduced from the one end of the pipe 23 on the side of the metal pipe 23b by the pumps 14a and 14b. In addition, an alternating current of a predetermined frequency (e.g., 20 kHz) is supplied from the radiofrequency power source 22 to the induction heating coil 21, so that an alternating field is formed inside the induction heating coil 21.

The area (metal pipe) 23b of the pipe 23, which is formed of a conductive material, is induction-heated by the alternating field formed inside the induction heating coil 21 so as to generate heat, whereby a reaction liquid flowing through the pipe 23 is heated up to a reaction temperature (e.g., 40° C. to 80° C.) by the heat generated by the area 23b formed of a conductive material. Thus, reaction of the reaction liquid is promoted and a coprecipitation reaction between the ferrous ions ($Fe^{2+}$) and the ferric ions ($Fe^{3+}$) occurs, whereby magnetite ($Fe_3O_4$) particles are generated. The thus generated magnetite particles are moved by a pressure of the reaction liquid flowing through the pipe 23 so as to be taken out from the other end of the pipe 23 through the area (resin pipe) 23a formed of a dielectric material.

When the magnetite particles are generated in the pipe 23, the magnetite particles function as a core (magenta core) in the area (resin pipe) 23a formed of a dielectric material. Thus, an inductance of the induction heating coil 21 increases, so that an impedance of the induction heating coil 21 increases. The impedance of the induction heating coil 21 is measured by the impedance measuring device 15.

The pump-flowrate deciding unit 16 reads out a measurement result from the impedance measuring device 15, and compares the measurement result with the previously stored target value.

When the measurement result is equal to or larger than the target value, the flowrate of each of the pumps 14a and 14b at this time is decided as the aforementioned pump flowrate set value.

On the other hand, when the measurement result is smaller than the target value, the measurement result is stored in the pump-flowrate deciding unit 16, and the pumps 14a and 14b are controlled such that the flowrate of the reaction liquid introduced into the one end of the pipe 23 increases.

In principle, as the pump flowrate increases, a generation efficiency of magnetite particles also increases until the pump flowrate reaches a certain threshold value. In accordance therewith, the impedance of the induction heating coil 21 increases (case 1). However, as the pump flowrate increases after exceeding the threshold value, an unreacted reaction liquid outflows from the other end of the pipe 23, which in turn decreases the generation efficiency of magnetite particles. In accordance therewith, the impedance of the induction heating coil 21 decreases (case 2).

The pump-flowrate deciding unit 16 reads out a measurement result from the impedance measuring device 15, and compares the measurement result with the stored previous measurement result.

When the current measurement result is larger than the stored previous measurement result, the situation is judged as the case 1, and the pumps 14a and 14b are controlled such that the flowrate of the reaction liquid introduced to the one end of the pipe 23 gradually increases. During this operation, the pump-flowrate deciding unit 16 successively reads out measurement results from the impedance measuring device 15, and compares the measurement results with the previously stored target value. At a time when one of the measurement results becomes the target value or more, the pump-flowrate deciding unit 16 decides each of the flowrates of the pumps 14a and 14b as the aforementioned pump flowrate set value.

On the other hand, when the current measurement result is smaller than the stored previous measurement result, the situation is judged as the case 2, and the pumps 14a and 14b are controlled such that the flowrate of the reaction liquid introduced to the one end of the pipe 23 gradually decreases. During this operation, the ump flow rate deciding unit 16 successively reads out measurement results from the impedance measuring device 15, and compares the measurement results with the previously stored target value. At a time when one of the measurement results becomes the target value or more, the pump-flowrate deciding unit 16 decides each of the flowrates of the pumps 14a and 14b as the aforementioned pump flowrate set value.

Then, each of the pumps 14a and 14b is set such that the reaction liquid is introduced from the one end of the pipe 23 at the pump flowrate (pump flowrate set value) decided by the pump-flowrate deciding unit 16. Thus, magnetite particles are hereafter generated in the pipe 23 at a desired generation efficiency or more corresponding to the impedance target value previously stored in the pump-flowrate deciding unit 16.

According to the above embodiment, the area 23b of the pipe 23, which is formed of a conductive material, is induction-heated by the alternating field inside the induction heating coil 21, and the reaction liquid introduced from the one end of the pipe 23 is heated by the heat generated by the area 23b formed of a conductive material, so that the reaction of the reaction liquid is promoted and thus ferromagnetic particles are generated. When ferromagnetic particles are generated in the pipe 23, the thus generated ferromagnetic particles function as a core (magnetic core) in the area 23a of the pipe 23, which is formed of a dielectric material. Thus, the inductance of the induction heating coil 21 increases, so that the impedance of the induction heating coil 21 increases. In this case, by measuring the impedance of the induction heating coil 21, a production efficiency of ferromagnetic particles in the pipe 23 can be easily estimated from outside.

In addition, according to this embodiment, ferromagnetic particles are continuously generated in the pipe 23, without need for stirring the reaction liquid in the reaction container. Thus, the reaction liquid is unlikely to vary in temperature and the mixed condition of the reaction liquid is unlikely to be non-uniform, so that variation of the generated ferromagnetic particles in composition and dimension is small. In addition, it is easy to observe the GMP.

In addition, in this embodiment, due to the application of the aforementioned principle of impedance elevation, a production efficiency of ferromagnetic particles is improved. That is to say, as the pump flowrate increases, a generation efficiency of ferromagnetic particles also increases until the pump flowrate reaches a certain threshold value. In accordance therewith, the impedance increases. However, at a pump flowrate beyond the threshold value, an unreacted reaction liquid outflows from the other end of the pipe, which in turn decreases the generation efficiency of ferromagnetic particles. In accordance therewith, the impedance decreases. Thus, in this embodiment, the pump-flowrate deciding unit 16 decides a pump flowrate by which the impedance becomes a predetermined value or more. Since the reaction liquid is introduced from the one end of the pipe 23 at the flowrate decided by the pump-flowrate deciding unit 16, a production efficiency of ferromagnetic particles can be maintained at a desired level or more.

In both the first embodiment and the second embodiment, magnetite particles as ferromagnetic particles are generated from an alkaline reaction liquid containing ferrous ions and ferric ions, by means of the coprecipitation reaction between the ferrous ions and the ferric ions. However, not limited thereto, nickel ferrite particles as ferromagnetic particles may be generated from an alkaline reaction liquid containing ferric ions and nickel ions, by means of a coprecipitation reaction between the ferric ions and the nickel ions.

In addition, in both the first embodiment and the second embodiment, the pump-flowrate deciding unit 16 decides, as a pump flowrate set value, a pump flow rate by which the impedance of the single mode cavity 11 or the induction heating coil 21 becomes the previously stored target value or more, based on a measurement result of the impedance measuring device 15. However, not limited thereto, a pump flowrate by which the impedance of the single mode cavity 11 or the induction heating coil 21 becomes a maximum value may be decided as a pump flowrate set value, based on a measurement result change of the impedance measuring device 15 with respect to a pump flowrate change. Further, a pump flowrate by which the impedance of the single mode cavity 11 or the induction heating coil 21 becomes a predetermined value or more (e.g., 90% of the maximum value or more) may be decided as a pump flowrate set value, based on a measurement result change of the impedance measuring device 15 with respect to a pump flowrate change.

As described above, the pump-flowrate deciding unit 16 may be constituted by a computer system, and a program for executing the pump-flowrate deciding unit 16 in the computer system and a computer-readable storage medium storing the program are also the subject matter of the present invention.

Furthermore, when the pump-flowrate deciding unit 16 is realized by a program (second program) such as OS operated in the computer system, a program including various commands for controlling the program such as OS, and a storage medium storing the program are also the subject matters of the present invention.

Herein, the storage medium includes one that can be recognized by itself, such as a flexible disc, and a network in which various signals are transmitted.

10 Ferromagnetic-particle manufacturing apparatus
11 Single mode cavity
12 Microwave oscillator
13 Pipe
14a Pump
14b Pump
15 Impedance measuring device
16 Pump-flowrate deciding unit
17 Coaxial cable
20 Ferromagnetic-particle manufacturing apparatus
21 Induction heating coil
22 Radiofrequency power source
23 Pipe
23a Area formed of dielectric material
23b Area formed of conductive material
24a Pump
24b Pump
25 Impedance measuring device
26 Pump-flowrate deciding unit
27 Radiofrequency cable
31 First liquid tank
32 Second liquid tank

The invention claimed is:

1. A method for manufacturing a ferromagnetic-particle comprising the steps of:
preparing a manufacturing apparatus including:
a single mode cavity that resonates with a microwave of a predetermined wavelength;
a microwave oscillator electrically connected to the single mode cavity and configured to introduce the microwave of the predetermined wavelength into the single mode cavity;
a pipe disposed in the single mode cavity to pass linearly through an inside of the single mode cavity, the pipe being formed of a dielectric material; and
a pump configured to introduce, from one end of the pipe, an alkaline reaction liquid in which metal ions of a ferromagnetic metal and hydroxide ions are dissolved;
introducing the reaction liquid having the dissolved metal ions of the ferromagnetic metal and hydroxide ions into the pipe by the pump before heating the reaction liquid;
reacting the reaction liquid in the pipe, after receiving the reaction liquid introduced by the pump, by introducing the microwave into the single mode cavity; and
generating the ferromagnetic-particle in the pipe based on the reaction liquid in the pipe in the absence of a stirring action of the reaction liquid in the pipe.

2. The method according to claim 1, wherein an axial length of the pipe is 20 mm to 200 mm.

3. The method according to claim 1, wherein the metal ions of the ferromagnetic metal are either or both of iron ions and nickel ions.

4. The method according to claim 1, further comprising the step of dissolving sodium hydroxide in the reaction liquid.

5. The method according to claim 1, wherein an internal diameter of the pipe is 0.3 mm to 5.0 mm.

6. The method according to claim 1, wherein the pump includes a first pump sending a metal salt solution containing metal ions and a second pump sending an alkaline solution containing hydroxide ions.

7. The method according to claim 1, wherein the manufacturing apparatus includes an impedance measuring device configured to measure an impedance of the single mode cavity, and
wherein the method further comprises the step of controlling a pump-flowrate of the reaction liquid based on a measurement result of the impedance during the reacting of the reaction liquid in the pipe, such that the impedance of the single mode cavity becomes a predetermined value.

8. The method according to claim 7, wherein:
when a current measurement result of the impedance is larger than a stored previous measurement result, the pump-flowrate of the reaction liquid introduced into the pipe is controlled to gradually increase, and
when the current measurement result of the impedance is smaller than the stored previous measurement result, the pump-flowrate of the reaction liquid introduced into the pipe is controlled to gradually decrease.

\* \* \* \* \*